United States Patent
Thaler et al.

(10) Patent No.: US 7,445,248 B2
(45) Date of Patent: Nov. 4, 2008

(54) THERMAL EXPANSION JOINT

(75) Inventors: David M. Thaler, Mossville, IL (US);
Richard A. Crandell, Morton, IL (US);
Kevin A. Daly, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 93 days.

(21) Appl. No.: 11/326,190

(22) Filed: Jan. 6, 2006

(65) Prior Publication Data

US 2007/0158941 A1    Jul. 12, 2007

(51) Int. Cl.
*F16L 11/12* (2006.01)
(52) U.S. Cl. ............... 285/47; 285/123.17; 285/187; 285/288.2; 285/381.1
(58) Field of Classification Search ............ 285/47–49, 285/187, 381.1, 123.17, 288.2, 288.5; 24/292–295
See application file for complete search history.

(56) References Cited

U.S. PATENT DOCUMENTS

| | | | | |
|---|---|---|---|---|
| 1,085,303 | A | * | 1/1914 | Scherer .............. 285/123.16 |
| 1,312,152 | A | * | 8/1919 | Barrow .................. 285/288.2 |
| 4,004,888 | A | | 1/1977 | Musall et al. |
| 5,408,828 | A | | 4/1995 | Kreucher et al. |
| 5,415,772 | A | | 5/1995 | Garcera et al. |
| 5,468,384 | A | | 11/1995 | Garcera et al. |
| 5,829,132 | A | | 11/1998 | Sickels et al. |
| 6,010,668 | A | | 1/2000 | Lawrence et al. |
| 6,128,821 | A | | 10/2000 | Grescher |
| 6,131,955 | A | * | 10/2000 | Bachmann et al. ............ 285/47 |
| 6,789,644 | B2 | | 9/2004 | Mukaida |
| 2004/0052697 | A1 | | 3/2004 | McIntosh et al. |
| 2004/0258583 | A1 | | 12/2004 | Hardesty et al. |
| 2005/0002836 | A1 | | 1/2005 | Hardesty et al. |

* cited by examiner

*Primary Examiner*—Aaron M Dunwoody
*Assistant Examiner*—Fannie Kee
(74) *Attorney, Agent, or Firm*—Finnegan, Henderson, Farabow, Garrett & Dunner

(57) ABSTRACT

A joint is provided permitting relative radial and axial movement between a first wall thermally expanding at a first amount and a second wall thermally expanding at a second amount. The joint includes a first fixed connection between a first edge of the second wall and the first wall. The joint also includes an endplate including a first edge and a second fixed connection between a second edge of the second wall and the first edge of the endplate. The joint also includes a clip and a third fixed connection between the clip and the first wall. The joint further includes a fourth fixed connection between the clip and the endplate, the clip permitting the relative radial and axial movement.

17 Claims, 2 Drawing Sheets

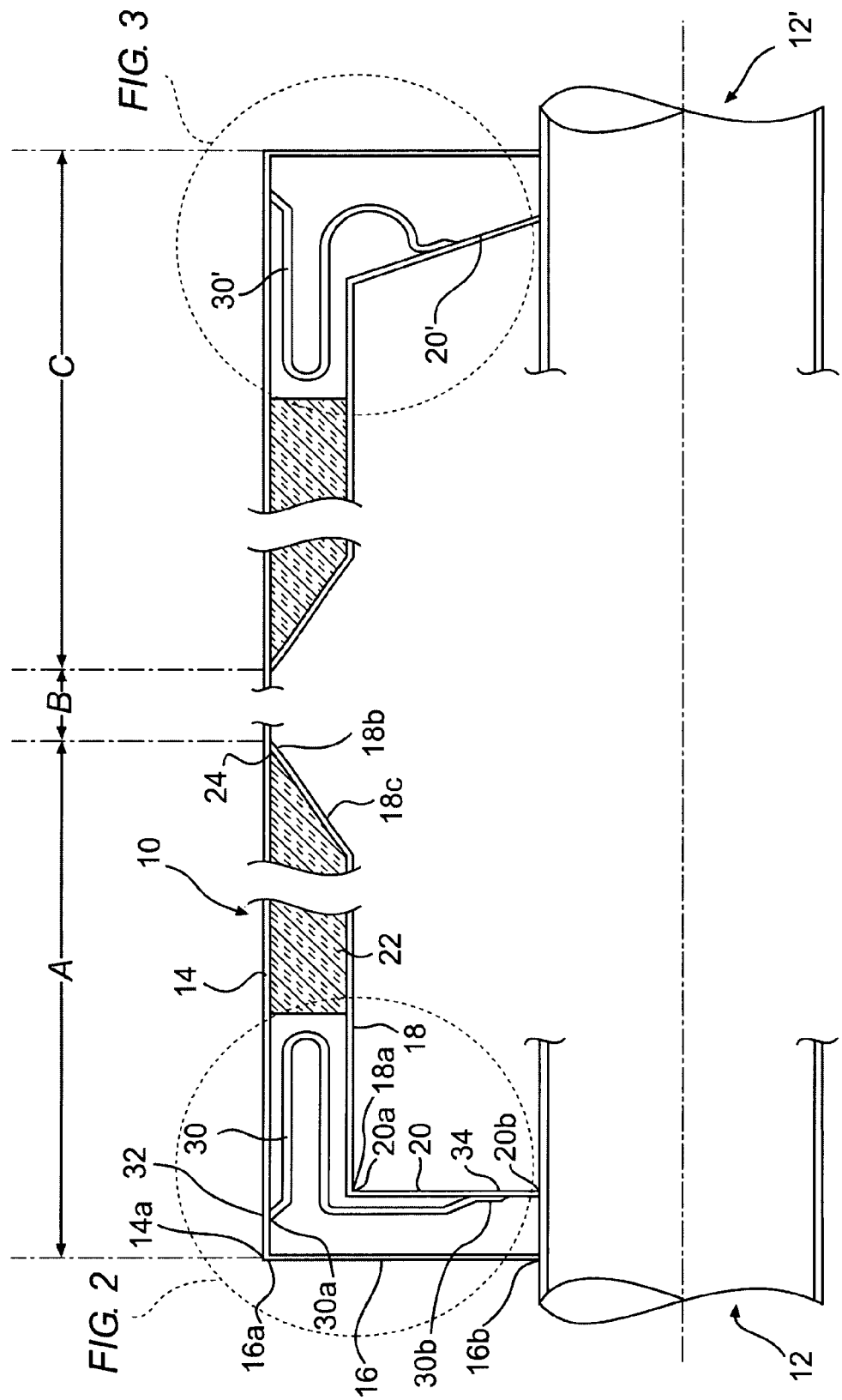

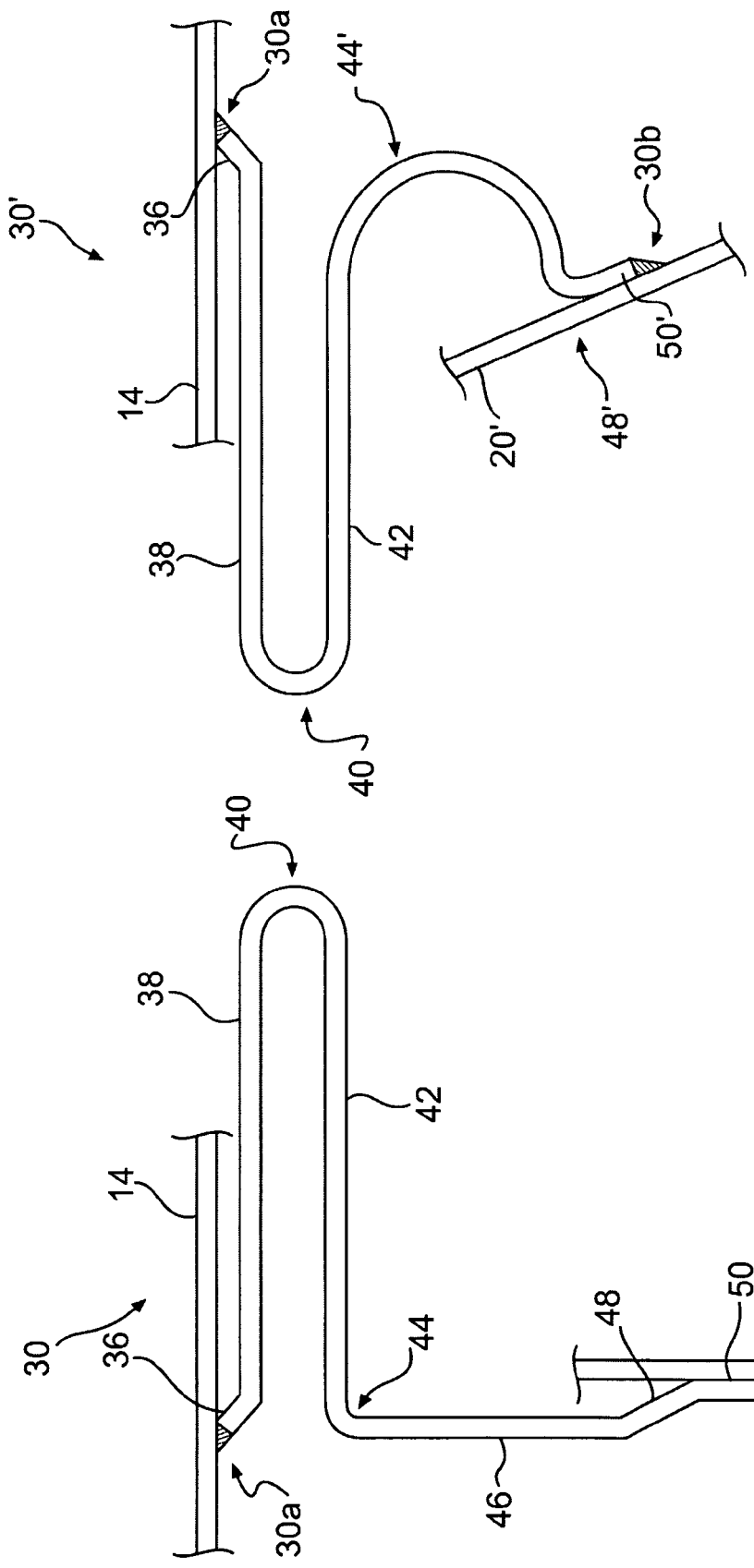

THERMAL EXPANSION JOINT

TECHNICAL FIELD

The present disclosure relates to a joint and, more particularly, to a thermal expansion joint.

BACKGROUND

Double walled apparatuses, such as, for example, double walled exhaust gas catalytic converters and/or other containers, are often used to insulate an inner environment from an outer environment. Such apparatuses typically include an inner wall exposed to the inner environment which has a first temperature, an outer wall exposed to the outer environment which has a second temperature, and insulation disposed between the inner and outer walls. The first and second temperatures are often substantially different. Such temperature differences may result in a substantial difference in amounts of thermal expansion for the inner and outer walls. Differences in thermal expansion may produce adverse effects, such as, stress concentrations at connections between the inner and outer walls, geometry deformation of one or both of the inner and outer walls, and/or structural weakness which may result in undesirably short life cycles of the apparatuses.

U.S. Patent Application Publication No. 2005/0002836 ("the '836 application") filed by Hardesty et al. discloses a gas treatment device comprising an inlet communicating exhaust gas into a housing. The '836 application also discloses a substrate disposed within the housing configured to support an exhaust gas catalyst and a retention device supporting the substrate radially within and spaced apart from the housing. The '836 application discloses two embodiments of the retention device, a fixed retention device and an unfixed retention device. The fixed retention device has a first end fixed via welding to the housing and a second end embedded within the substrate via a compression connection. The unfixed retention device has a first end engaging but not fixed to the housing and a second end engaging but not fixed to the substrate. Both the fixed and unfixed retention devices are configured to flexibly support the substrate with respect to the housing and account for differential thermal expansion.

Although the retention device of the '836 application may account for differential thermal expansion between the housing and the substrate, by being embedded within the substrate, the retention device may damage the substrate during assembly and/or operation. Additionally, the retention device of the '836 application may not suitably dampen vibrations between the housing and the substrate. Furthermore, the connection between the retention device and the substrate of the '836 application may be undesirably prone to loosening during operation.

The present disclosure is directed to overcoming one or more of the shortcomings set forth above.

SUMMARY OF THE INVENTION

In one aspect, the present disclosure is directed to a joint permitting relative radial and axial movement between a first wall thermally expanding at a first amount and a second wall thermally expanding at a second amount. The joint includes a first fixed connection between a first edge of the second wall and the first wall. The joint also includes an endplate including a first edge and a second fixed connection between a second edge of the second wall and the first edge of the endplate. The joint also includes a clip and a third fixed connection between the clip and the first wall. The joint further includes a fourth fixed connection between the clip and the endplate, the clip permitting the relative radial and axial movement.

In another aspect, the present disclosure is directed to a method of permitting differential thermal expansion between a substantially cylindrical inner wall and a substantially cylindrical outer wall. The method comprises fixedly connecting the inner and outer walls at a first joint between the outer wall and a first edge of the inner wall. The method also includes supporting a second edge of the inner wall via a clip including a plurality of bend portions and configured to allow the inner and outer wall to thermally expand by different amounts. The method further includes fixedly connecting a first edge of the clip to the outer wall at a second joint and fixedly connecting a second edge of the clip to the inner wall. The method still further includes flexing at least one of the bend portions to accommodate the differential thermal expansion.

In yet another aspect, the present disclosure is directed to an exhaust gas treatment device for reducing substances within the exhaust gas before the exhaust gas is released to an environment. The exhaust gas treatment device includes a first pipe configured to communicate exhaust gas into an inner chamber. The device further includes a first endplate fixedly connected to the first pipe and a substantially cylindrical outer wall fixedly connected to the first endplate. The device also includes a substantially cylindrical inner wall fixedly connected to the outer wall at a first inner wall edge. The inner wall defines the inner chamber. The device also includes a second endplate fixedly connected to the inner wall at a second inner wall edge, the first and second inner wall edges establishing first and second axial ends of the inner wall. The device further includes the second endplate slideably coupled to the inlet pipe and at least one clip including a first edge fixedly connected to the outer wall and a second edge fixedly connected to the second endplate.

BRIEF DESCRIPTION OF THE DRAWINGS

FIG. 1 is a diagrammatic partial view illustration of an exemplary doubled wall apparatus according to the present disclosure;

FIG. 2 is a diagrammatic side view illustration of an exemplary clip of the double walled apparatus of FIG. 1; and FIG. 3 is a diagrammatic side view illustration of another exemplary clip of the double walled apparatus of FIG. 1.

DETAILED DESCRIPTION

FIG. 1 illustrates a partial view of an exemplary double walled container embodied as a catalytic converter 10. It is noted that the double walled container is illustrated as a catalytic converter 10 for explanatory purposes and the description below is applicable to any double walled container. Catalytic converter 10 may include any type of catalytic treatment device configured to reduce an amount of undesirable substances within an exhaust gas by, for example, absorbing, adsorbing, trapping, and/or converting into innocuous substances, the undesirable substances. Catalytic converter 10 may include exhaust pipes 12, 12', an outer wall, 14, an inner wall 18, endplates 16, 20, insulation 22, and at least one of clips 30, 30'. It is contemplated that catalytic converter 10 may be substantially cylindrical or any other suitable shape and may include additional components, such as, for example, additional pipes at any suitable location, temperature or pressure sensors, clamps, flanges, brackets, and/or any other component known in the art. It also contemplated that catalytic converter 10 may, for example, include an inlet portion A, a catalyst portion B, and an outlet portion C, as is known in the art.

Exhaust pipes 12, 12' may include an inlet or an outlet pipe configured to communicate exhaust gas into or out of catalytic converter 10. For example, exhaust pipe 12 may be connected to upstream components, such as, for example, an exhaust manifold, to communicate exhaust gas produced by an engine into catalytic converter 10. Additionally, exhaust pipe 12' may be connected to downstream components, such as, for example, a muffler, to communicate exhaust gas toward a release to the environment. It is contemplated that exhaust pipes 12, 12' may include any shape, may extend into catalytic converter 10 at any angle through endplates 16, 20 and/or may be connected to upstream or downstream components in any manner suitable in the art. It is also contemplated that exhaust pipes 12, 12' may extend into catalytic converter 10 in any suitable manner, such as, for example, a cantilevered stub end or frustoconical end, as is known in the art. It is further contemplated that exhaust pipes 12, 12' may include perforations, orifices, and/or other features configured to affect a flow of exhaust gas to and/or from catalytic converter 10.

Outer wall 14 may include a substantially cylindrical wall configured to provide structural support to catalytic converter 10. Specifically, outer wall 14 may include a first edge 14a fixedly connected, e.g., welded, to endplate 16. Outer wall 14 may also be fixedly connected to inner wall 18 at joint 24. It is contemplated that outer wall 14 may include a second edge (not referenced), opposite first edge 14a, which may extend beyond joint 24 and may be connected to another endplate, another cylindrical wall, and/or other components of catalytic converter 10 via any suitable connection known in the art, such as, for example, a welded joint, a clamped or bolted flange, and/or a press fit connection. It is also contemplated that outer wall 14 may include any shape, e.g., multifaceted, and that joint 24 may be disposed at any distance from first edge 14a. It is further contemplated that outer wall 14 may be fixedly connected to endplate 16 to establish a sealing connection therebetween via any suitable connection, such as, for example, welding, clamping, soldering, or other connection known in the art.

Endplate 16 may include a substantially circular plate and may be configured to connect outer wall 14 with exhaust pipes 12. Specifically, endplate 16 may be fixedly connected at a first edge 16a to outer wall 14 and may include a second edge 16b, e.g., an aperture configured to accept exhaust pipe 12, fixedly connected to exhaust pipe 12. First edge 16a may be approximately the same size and shape, e.g., substantially circular, as first edge 14a of outer wall 14. Second edge 16b may be approximately the same size and shape, e.g., substantially circular, as an outer diameter of exhaust pipe 12. It is contemplated that endplate 16 may be fixedly connected to exhaust pipes 12 to establish a sealing connection therebetween via any suitable connection, such as, for example, welding, clamping, soldering, or other connection known in the art. It is further contemplated that endplate 16 may include a flat or a domed shape and may extend at an acute, obtuse, or substantially right angle with respect to outer wall 14 and second edge 16b may include any shape, e.g., multifaceted.

Inner wall 18 may include a substantially cylindrical wall and may be include a diameter less than a diameter of outer wall 14. As such, inner wall 18 may be configured to establish a gap with respect to outer wall 14. Specifically, inner wall 18 may include a first edge 18a fixedly connected to endplate 20 and may include a second edge 18b fixedly connected to outer wall 14 at joint 24. It is contemplated that inner wall 18 may include a shaped portion 18c, e.g. a taper portion or any other suitably shaped portion, configured to span the gap between inner wall 18 and outer wall 14. It is also contemplated that inner wall 18 may be fixedly connected to endplate 20 to establish a sealing connection therebetween via any suitable connection, such as, for example, welding, clamping, soldering, or other connection known in the art. It is further contemplated that inner wall 18 may include any shape, e.g., multifaceted.

Endplate 20 may include a substantially circular plate and may be configured to be connected to inner wall 18. Specifically, endplate 20 may be fixedly connected at a first edge 20a to inner wall 18 and may include a second edge 20b, e.g., an aperture configured to accept exhaust pipe 12, disposed adjacent to exhaust pipe 12. It is contemplated that endplate 20 may be movable relative to exhaust pipe 12 via any suitable connection therebetween, such as, for example, sliding contact, a gap, a plurality of equally or unequally spaced engagement sections between the second edge 20b and the exhaust pipe 12, and/or a low friction sealing arrangement. It is also contemplated that endplate 20 may include a flat or a domed shape and may extend at an acute, obtuse, or substantially right angle with respect to outer wall 14. For example, as illustrated in FIG. 1, catalytic converter 10 may include an endplate 20'.

Insulation 22 may be disposed between outer and inner walls 14, 18 within the gap and may be configured to establish outer and inner walls 14, 18 at different temperatures. Specifically insulation 22 may include any suitable material, such as, for example, fibrous material and may be configured to reduce heat transfer of a relatively hot environment with respect to a relatively cold environment. It is contemplated that insulation 22 may reduce the effects of a relatively high temperature environment, which may be caused by an exhaust gas communicated from exhaust pipes 12, with respect to outer wall 14. It is also contemplated that insulation 22 may reduce the effects of a relatively cold environment outside outer wall 14, which may be caused by a low temperature environment surrounding outer wall 14, with respect to inner wall 18. It is further contemplated that a temperature differential between outer and inner walls 14, 18 may be, for example, 400 degrees Celsius and may result in a differential thermal expansion between outer and inner walls 14, 18 of, for example, approximately 0.125 inches. It is noted that the differential thermal expansion between outer and inner walls 14, 18 may be a function of, for example, a diameter, length, and/or other dimensions of outer and inner walls 14, 18, the magnitude of the temperature differential of outer and inner walls 14, 18, and/or other factors known in the art.

Clip 30 may be fixedly connected to outer wall 14 and endplate 20 and may be configured to support inner wall 18 with respect to outer wall 14. Specifically, clip 30 may include a first edge 30a fixedly connected to outer wall 14 at a first clip joint 32 and may include a second edge 30b fixedly connected to endplate 20 at a second clip joint 34. It is contemplated that clip 30 may be configured to allow for movement between outer and inner walls 14, 18 and dampen vibration of inner wall 18 and endplate 20. It is also contemplated that clip 30 may include a plurality of clips radially disposed around exhaust pipes 12, 12' at regular or irregular intervals. For example, a plurality of clips may be disposed at obtuse, acute, or substantially right angle intervals and may be equally or unequally spaced, e.g., three clips disposed at 120 degree intervals or two clips spaced at an acute angle with respect to one another and equally spaced from a third clip at obtuse angles. It is further contemplated that clip 30 may include any shape along the radial direction around exhaust pipes 12, 12', such as, for example a substantially arcuate or substantially straight shape. As such, clip 30 interconnected between outer and inner walls 14, 18 may allow for radial and axial thermal expansion between outer and inner walls 14, 18. Further description of clip 30 is set forth below with respect to FIG. 2.

FIG. 2 illustrates a profile view of an exemplary clip 30. Specifically, clip 30 may include a first portion 36 extending from first edge 30a. First portion 36 may extend from outer wall 14 at an angle and may be connected to a second portion 38. Second portion 38 may extend from first portion 36 along and substantially parallel to outer wall 14 and may be connected to a first bend portion 40. First bend portion 40 may include a substantially U-shaped bend and may be configured as a corrugation. First bend portion 40 may connect second portion 38 and a third portion 42. Third portion 42 may extend from first bend portion 40 along and substantially parallel to outer wall 14 and may be connected to a second bend portion 44. Second bend portion 44 may include a substantially L-shaped bend and may be connected to a fourth portion 46. Fourth portion 46 may extend from second bend portion 44 radially inward with respect to outer wall 14. Fourth portion 46 may be connected to a fifth portion 48. Fifth portion 48 may be connected to fourth portion 46 and extend therefrom at an angle towards endplate 20. Fifth portion 48 may be connected to a sixth portion 50. Sixth portion 50 may extend substantially parallel to and adjacent endplate 20 to second edge 30b. It is contemplated that any angle of clip 30 may include an obtuse, an acute, or a substantially right angle, that first and second bend portions 40, 44 may include any concave shape, and that any portion or bend portion of clip 30 may include any length with respect to any other portion or bend portion of clip 30. It is also contemplated that the bend portions and angled connections of clip 30 may allow clip 30 to flex, e.g., first bend portion 40 may establish a spring bias between second portion 38 and third portion 42. As such, clip 30 may allow outer wall 14 and inner wall 18 to thermally expand by different amounts.

FIG. 3 illustrates a profile view of another exemplary clip 30'. Clip 30' is structurally and functionally similar to clip 30 described above. As such, for clarification purposes, only the differences of clip 30' are explained below. Clip 30' may include a second bend portion 44' extending from third portion 42. Second bend portion 44' may include a substantially U-shaped bend and may be connected to a third bend portion 48'. Third bend portion 48' may include a substantially U-shaped bend orientated opposite second bend portion 44'. Third bend portion 48' may be connected to a sixth portion 50'. Sixth portion 50' may extend substantially parallel to and adjacent endplate 20'. It is contemplated that any angle of clip 30' may include an obtuse, an acute, or a substantially right angle, that any bend portions of clip 30' may include any concave shape, and that any portion or bend portion of clip 30' may include any length relative with respect to any other portion or bend portion of clip 30'. It is contemplated that sixth portion 50' may be angled to accommodate an angled or domed endplate, e.g., endplate 20'. It is also contemplated that the bend portions and angled connections of clip 30 may allow clip 30 to flex, e.g., first bend portion 40 may establish a spring bias between second portion 38 and third portion 42. As such, clip 30 may allow outer wall 14 and inner wall 18 to thermally expand by different amounts.

It is contemplated that outer and inner walls 14, 18 and clips 30, 30' may be constructed of any suitable material such as, for example, stainless steel or other metal and may be formed by hot or cold bending, rolling, or other suitable geometry shaping manufacturing method. It is also contemplated that outer and inner walls 14, 18 and clips 30, 30' may or may not be constructed of the same material. It is noted that clips 30 and 30' have been illustrated in FIGS. 2 and 3 as being connected to outer wall 14 and endplate 20 via fillet welds for exemplary purposes only and it is contemplated that clips 30, 30' may be fixedly connected at respective edges thereof via any suitable connection, such as, for example, soldered, brazed, groove welded, using any suitable method, such as, for example, mig welding, tig welding, arc welding, soldering, brazing, or other connecting method known in the art. It is further contemplated that any fixed connection and/or joint described herein may include a continuous, e.g., a weld spanning around the full joint, or a spaced, e.g., a plurality of interspaced welds around the joint, connection.

INDUSTRIAL APPLICABILITY

The disclosed thermal expansion joint may be applicable to any double walled apparatus. The disclosed joint may be configured to permit axial and radial thermal expansion between the inner and outer walls of a double walled apparatus. The operation of the thermal expansion joint is explained below with reference to clip 30 and catalytic converter 10, however, it is noted that the explanation is applicable to clip 30' and/or any double walled apparatus.

Catalytic converter 10 may be included within an exhaust system for receiving, treating, and delivering, exhaust gas produced by an internal combustion engine, e.g., a spark or compression engine. As such, exhaust gas having a relatively high temperature may be communicated to exhaust pipe 12 for treatment by a catalyst within catalytic converter 10. Because of the relatively high temperature of the exhaust gas, the components of catalytic converter 10 may, via heat transfer, also achieve a high temperature. Having external components of catalytic converter 10 at high temperatures may be undesirable because of safety concerns, potential damage to components adjacent to catalytic converter 10, potential harm to individuals touching catalytic converter 10, heat loss from catalytic converter 10, and/or other suitable reasons. Accordingly, insulation 22 may be disposed between outer wall 14 and inner wall 18 to reduce the heat transfer from within to outside catalytic converter 10 and thus from inner wall 18 toward outer wall 14. Because outer wall 14 may be at a lower temperature than inner wall 18, each wall may thermally expand axially and/or radially at different amounts. Additionally, it may be desired that outer and inner walls 14, 18, endplates 16, 20, and exhaust pipes 12, 12' be interconnected to provide structural support for catalytic converter 10, to reduce exposure of exhaust gas to insulation 22, reduce vibration of inner wall 18, and/or any other suitable reason.

Referencing FIGS. 1 and 2, outer wall 14 may be fixedly connected to endplate 16 which may be fixedly connected to exhaust pipe 12. Inner wall 18 may be fixedly connected to outer wall 14 at joint 24 and fixedly connected to endplate 20. Endplate 20 may be movable with respect to exhaust pipe 12. As such, inner wall 18 may be fixedly supported at second edge 18b at joint 24 and movably supported at first edge 18a via the movable connection between endplate 20 and exhaust pipe 12. Accordingly, it may be desired to provide support to inner wall 18 adjacent second edge 18b and/or inner wall 18 may experience vibration due to the movable connection, e.g., unfixed connection, between endplate 20 and exhaust pipe 12. It is contemplated that the environment and/or use of catalytic converter 10, e.g., by being attached to a mobile vehicle traversing uneven terrain and/or the flow of exhaust gas through catalytic converter 10 may cause vibration of inner wall 18 and/or noise, e.g., inner wall 18 vibrating and endplate 20 contacting pipe 12.

Clip 30 may be fixedly connected to outer wall 14 at first edge 30a and fixedly connected to endplate 20 at second edge 30b. As such, clip 30 may fixedly connect outer wall 14 and endplate 20 and may, as a result, support endplate 20, and thus first edge 18a of inner wall 18. Outer and inner walls 14, 18 may be exposed to different temperatures and may thermally expand at different amounts. Because outer wall 14 may be fixedly connected to pipe 12 and inner wall 18 may be fixedly connected to outer wall 14 and movable with respect to pipe 12, endplate 20 may move with respect to exhaust pipe 12. Accordingly, clip 30 may be configured to flex at one or more of the bend portions or angled connections therein to accommodate endplate 20 moving with respect to exhaust pipe 12. Because clip 30 may flex, inner wall 18 may be able to expand relative to outer wall 14 and affect movement of endplate 20 with respect to exhaust pipe 12. As such, clip 30 may provide support to endplate 20 and thus inner wall 18 and allow outer and inner walls 14, 18 to thermally expand at different amounts. It is contemplated that supporting inner wall 18 at second edge 18b to outer wall 14 via joint 24 and supporting endplant 20 to outer wall 14 via clip 30 may reduce inner wall 18 and/or endplate 20 from vibrating. A reduction in vibration may reduce undesirable noise, improve structural integrity, and/or extend the life of catalytic converter 10.

It will be apparent to those skilled in the art that various modifications and variations can be made to the disclosed thermal expansion joint. Other embodiments will be apparent to those skilled in the art from consideration of the specification and practice of the disclosed joint. It is intended that the specification and examples be considered as exemplary only, with a true scope being indicated by the following claims and their equivalents.

What is claimed is:

1. A joint permitting relative radial and axial movement between a first wall thermally expanding a first amount and a second wall thermally expanding at a second amount, the joint comprising:
   a first fixed connection attaching a first edge of the second wall to the first wall;
   an endplate including a first edge of the endplate;
   a second fixed connection attaching a second edge of the second wall to the first edge of the endplate;
   a clip;
   a third fixed connection attaching the clip to the first wall; and
   a fourth fixed connection attaching the clip to the endplate, the clip permitting the relative radial and axial movement;
   wherein the first, second, third, and fourth fixed connections include welded joints.

2. The joint of claim 1, wherein:
   the first and second walls are substantially cylindrical;
   the first wall is disposed substantially concentric with respect to the second wall; and
   the second wall is disposed radially within the first wall.

3. The joint of claim 1, wherein the clip includes at least two bend portions.

4. The joint of claim 1, wherein the clip further includes:
   at least two bend portions;
   at least one of the two bend portions disposed within a gap defined between the first and second walls;
   a first edge fixedly connected to the first wall as part of the third fixed connection; and
   a second edge fixedly connected to the endplate as part of the fourth fixed connection.

5. The joint of claim 1, wherein:
   the first and second walls are constructed of the same material;
   the first wall is exposed to a first temperature; and
   the second wall is exposed to a second temperature, the second temperature being higher than the first temperature.

6. The joint of claim 5, wherein the second wall is exposed to exhaust gas, a temperature of the exhaust gas defining the second temperature.

7. An exhaust gas treatment device for reducing substances within the exhaust gas before the exhaust gas is released to an environment comprising:
   a first pipe configured to communicate exhaust gas into an inner chamber;
   a first endplate fixedly connected to the first pipe;
   a substantially cylindrical outer wall fixedly connected to the first endplate;
   a substantially cylindrical inner wall fixedly connected to the outer wall at a first inner wall edge, the inner wall defining the inner chamber;
   a second endplate fixedly connected to the inner wall at a second inner wall edge, the first and second inner wall edges establishing first and second axial ends of the inner wall;
   the second endplate slideably coupled to the first pipe; and
   at least one clip including a first edge fixedly connected to the outer wall and a second edge fixedly connected to the second endplate.

8. The exhaust gas treatment device of claim 7, wherein the first and second endplates are substantially circularly shaped.

9. The exhaust gas treatment device of claim 7, further including a plurality of clips substantially equally spaced around a longitudinal axis of the exhaust gas treatment device.

10. The exhaust gas treatment device of claim 7, wherein the inner wall is fixedly connected to the outer wall via a welded joint between the inner and outer walls.

11. The exhaust treatment device of claim 7, further including:
    a first fixed joint between the outer wall and a first edge of the first endplate; and
    a second fixed joint between a second edge of the first endplate and the pipe.

12. The exhaust treatment device of claim 7, further including:
    a first fixed joint between the first edge of the at least one clip and the outer wall; and
    a second fixed joint between the second edge of the at least one clip and the second endplate.

13. The exhaust treatment device of claim 7, wherein the second endplate is slideably coupled to the first pipe via a first joint between a first edge of the second endplate and the first pipe, the first joint including at least a portion of the first edge of the second endplate not engaging the first pipe.

14. A joint permitting relative radial and axial movement between a first wall thermally expanding a first amount and a second wall thermally expanding at a second amount, the joint comprising:
    a first fixed connection between a first edge of the second wall and the first wall;
    an endplate including a first edge of the endplate;
    a second fixed connection between a second edge of the second wall and the first edge of the end plate;
    a clip;
    a third fixed connection between the clip and the first wall; and a fourth fixed connection between the clip and the endplate, the clip permitting the relative radial and axial movement;

wherein the first, second, third, and fourth fixed connections include welded joints.

15. The joint of claim 14, wherein:

the first and second walls are substantially cylindrical;

the first wall is disposed substantially concentric with respect to the second wall; and the second wall is disposed radially within the first wall.

16. The joint of claim 14, wherein the endplate radially extends from the second edge of the second wall inward to a pipe, the endplate further including a second edge configured to be movably associated with an outer surface of the pipe.

17. The joint of claim 16, wherein the pipe is configured to communicate exhaust gas into an interior of the second wall.

* * * * *

UNITED STATES PATENT AND TRADEMARK OFFICE
CERTIFICATE OF CORRECTION

PATENT NO. : 7,445,248 B2  Page 1 of 1
APPLICATION NO. : 11/326190
DATED : November 4, 2008
INVENTOR(S) : David M. Thaler It is certified that error appears in the above-identified patent and that said Letters Patent is hereby corrected as shown below:

Please correct the Specification as follows:
Column 3, line 19, delete "frustoconical" and insert -- frustroconical --.

Column 7, line 21, delete "endplant" and insert -- endplate --.

Signed and Sealed this

Twenty-fourth Day of March, 2009

JOHN DOLL
*Acting Director of the United States Patent and Trademark Office*